Feb. 23, 1960 C. G. EILERS 2,926,214

SUBSCRIPTION TELEVISION SYSTEM

Filed Sept. 26, 1957 2 Sheets-Sheet 1

Inventor
Carl G. Eilers
By John J. Pederson
Attorney

Feb. 23, 1960 C. G. EILERS 2,926,214

SUBSCRIPTION TELEVISION SYSTEM

Filed Sept. 26, 1957 2 Sheets-Sheet 2

2,926,214

SUBSCRIPTION TELEVISION SYSTEM

Carl G. Eilers, Fairbury, Ill., assignor to Zenith Radio Corporation, a corporation of Delaware Application September 26, 1957, Serial No. 686,373

16 Claims. (Cl. 178—5.1)

Figure 1:
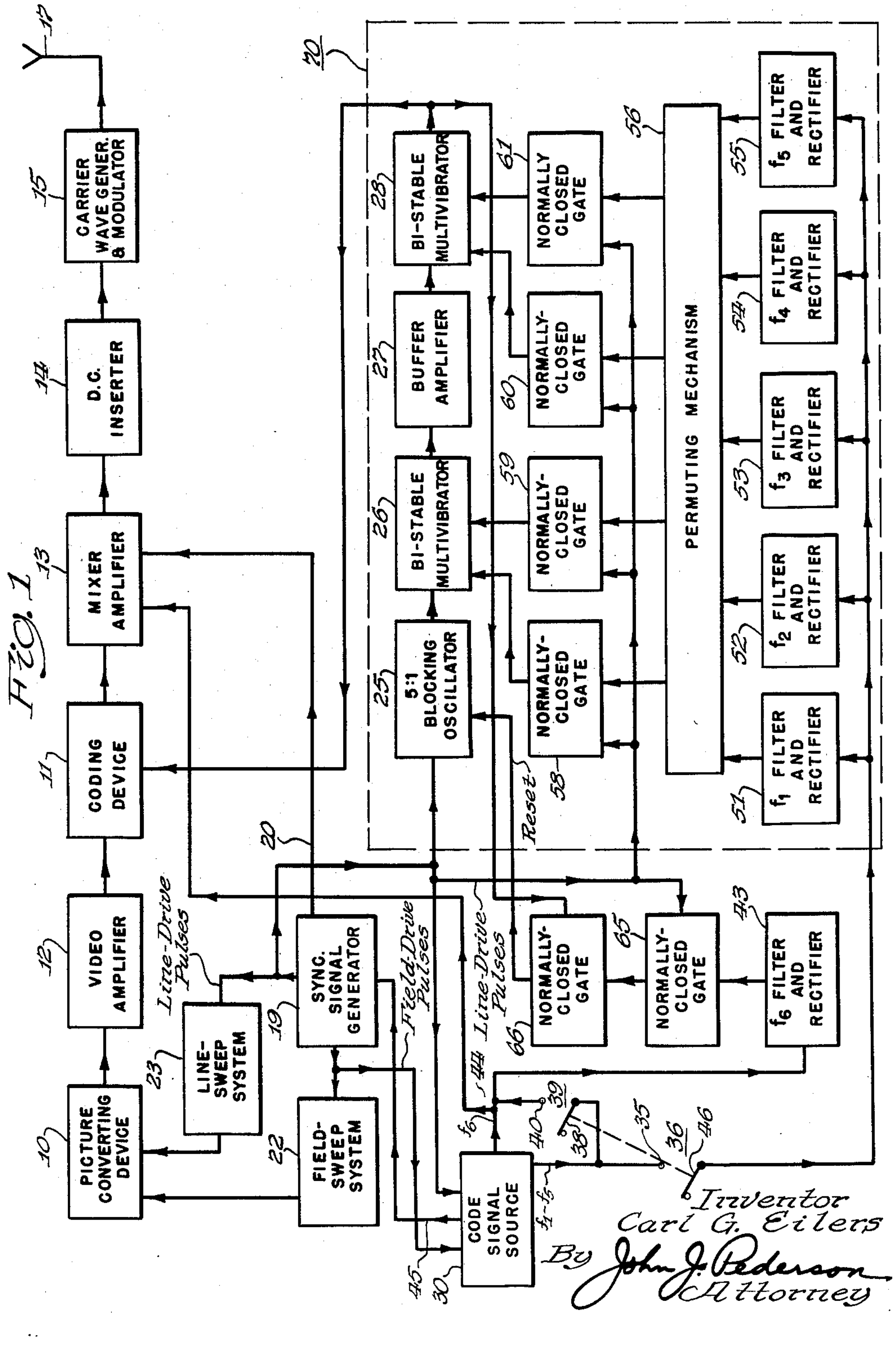

This invention relates in general to subscription television systems in which a television signal is transmitted in coded form to be utilized only in subscriber receivers equipped with adjustable decoding apparatus correctly adjusted. More particularly, it is directed to a system for facilitating the transmission of coded program information that may be decoded or unscrambled in any receiver containing adjustable decoding apparatus regardless of the instantaneous adjustment thereof at the time of transmission.

Since portions of the transmitter and receiver may be identical, the term "encoding" is used herein in its generic sense to encompass either coding at the transmitter or decoding at the receiver.

Several subscription television systems have been proposed wherein coding is achieved at a transmitter with the use of an adjustable mechanism whose instantaneous adjustment determines at least in part the particular manner in which the television signal is initially coded. A corresponding adjustable mechanism is employed at each subscriber receiver to realize decoding. With that type of arrangement, a different adjustment is preferably employed for each subscription program and those persons having receivers properly equipped must be apprised of the correct adjustments in order to view each program. This provides a basis for convenient assessment of charges to the subscribers based on the specific programs for which adjustment information is supplied.

Systems of this general type may be found, for example, in copending applications Serial No. 281,418, filed April 9, 1952, and issued July 15, 1958 as Patent 2,843,656, in the name of George V. Morris et al.; Serial No. 326,107, filed December 15, 1952, and issued February 11, 1958 as Patent 2,823,252, in the name of Jack E. Bridges; Serial No. 370,174, filed July 24, 1953, in the name of Walter S. Druz; and Serial No. 479,170, filed December 31, 1954, in the name of Erwin M. Roschke, all of which are assigned to the present assignee. In one described embodiment of the copending Roschke application, for example, a system is described wherein a 20:1 counting mechanism, including a 5:1 blocking oscillator and two bi-stable multivibrators, responds in cyclic fashion to applied line-drive pulses to develop a periodically-recurring square wave shaped control signal that is employed to periodically delay the video information with respect to the synchronizing information at a rate faster than the field-scanning frequency to effect coding. This in itself results in a picture display at an unauthorized receiver in which portions of the picture or horizontal strips "jitter" back and forth with respect to each other at a corresponding faster-than-field rate.

In order to introduce additional scrambling, the cyclic actuation of the counting mechanism may be interrupted during portions of the field-retrace intervals to effectively phase modulate the square wave about the mean frequency determined by the 20:1 counting ratio. Such interruption may be realized by developing a combination of randomly sequenced code signal bursts or components, individually having a predetermined one of six different identifying frequencies $f_1$–$f_6$. The bursts or components are segregated from one another with respect to frequency by means of a series of filter and rectifier units and are applied to various input circuits of an adjustable permutation switching mechanism (adjusted differently for each program) wherein they are routed or channeled, in accordance with any one of a multiplicity of different permutation patterns as established by the switching mechanism, to the input circuits of a series of gate circuits to gate in selected line-drive pulses to a series of input circuits of the bi-stable multivibrators included in the counting mechanism.

A "gated reset" feature is also disclosed in the Roschke application. Specifically, a translating or gating means in the form of a normally-closed gate circuit receives through the permutation switching mechanism code signal components having an identifying frequency of any one of frequencies $f_1$–$f_6$, as determined by the instantaneous setting of the switching mechanism, and when the gate is established in its open or translating condition the received code signal components are utilized to reset the 5:1 blocking oscillator to its reference or zero-count condition in the counting mechanism. Each subscriber receiver contains circuitry identical to that at the transmiter and unless the permutation switching mechanism is adjusted or set up at each receiver in the manner prescribed for each individual program, the correct channeling or distribution of the code signal components to the bi-stable multivibrators and to the blocking oscillator will not be effected and decoding is not obtainable. Thus, it is necessary to match the setting of the transmitter permutation mechanism at a receiver in order to unscramble a received coded television signal. A charge is assessed when the subscriber obtains the correct setting information. Of course, the permutation mechanisms at different receivers may be arranged to require specifically different settings to decode the same program.

In any system of subscription television, it may be desirable from time to time to provide entire programs that are free of charge to the subscriber receivers containing decoding equipment as a "bonus" feature, while preventing intelligible reception by non-subscriber receivers. Furthermore, it is also helpful from a commercial standpoint to be able to transmit free program information to the subscribers during an initial portion of each program in order that each subscriber may view that portion before deciding on subscribing to the entire program. Of course, the transmitted television signal must be coded in any case so that it may not be successfully reproduced at non-subscriber receivers. To this end, the present application is addressed to a subscription system containing adjustable encoding apparatus that ordinarily must be adjusted in a particularly unique manner to unscramble a coded television signal representing a program for which a charge is made, and yet is capable of automatically unscrambling a coded signal representing free program information where the instantaneous encoding apparatus adjustment, whatever it may be, has no bearing or effect on the encoding operation.

It is, accordingly, an object of the present invention to provide a new and improved subscription television system for transmitting coded program information that may be uncoded in subscriber receivers only.

It is another object of the invention to provide an improved subscription television system having adjustable encoding apparatus which must be properly set up to encode during program intervals for which a charge is made and yet need not be adjusted during intervals in which the transmission is on a free or no-charge basis.

It is still another object of the present invention to improve the system shown in the aforementioned Roschke application, Serial No. 479,170.

It is an additional object to provide a subscription television transmitter that may be actuated either in one operating condition wherein the television signal is coded to represent a program for which a charge is made or another operating condition in which the television signal is coded to represent a program for which no charge is assessed.

It is a further object of the present invention to provide an improved subscription television receiver for successfully decoding a television signal which has been coded in one manner during certain intervals to provide free program information and during other time intervals in a different manner to provide program information on a subscription or charge basis.

A subscription television system, constructed in accordance with one aspect of the present invention, comprises a subscription television transmitter for broadcasting television program signals having audio and video components, at least one of which is scrambled in accordance with a code schedule. There are a plurality of subscription television receivers each of which is equipped with decoding apparatus actuable to restore the intelligibility of the scrambled program signals and also a control device for controlling the operation of the decoding apparatus in accordance with the code schedule while providing a basis for determining actual utilization of the scrambled program signals. There are means under the control of the transmitter for actuating the decoding apparatus of all of the receivers entirely independently of their associated control devices to provide unscrambled reception of selected programs for all subscribers to the system while retaining secrecy with respect to television receivers not equipped with such decoding apparatus.

In accordance with another aspect of the invention, in the system described immediately above the code schedule is selected from either one of two different groups of code schedules. The control device has a multiplicity of positions, requiring a particular adjustment on the part of the subscriber to which it is assigned any time the scrambled program signals are coded in accordance with a code schedule selected from a predetermined one of the groups, whereas automatic decoding takes place, irrespective to the instantaneous position of the control device, any time the scrambled program signals are coded in accordance with a code schedule selected from the other one of the groups.

A subscription television transmitter, constructed in accordance with still another aspect of the present invention, comprises a coding device for varying the operating mode of the transmitter. A source of code signal components is provided, and actuating apparatus including adjustable permuting means coupled between the source and the coding device is provided for permuting some of the code signal components in accordance with the instantaneous permutation pattern established by the permuting means. The actuating apparatus further includes a control mechanism coupled to the permuting means and to the coding device for utilizing the permuted components to at least partially control the operation of the coding device in accordance with a code schedule. Multi-condition translating means couples the source to the actuating apparatus for supplying certain ones only of the code signal components to the actuating apparatus to at least partially control the operation of the coding device. Means are coupled to the control mechanism and to the translating means for varying the translating condition of the translating means in accordance with a schedule related to the code schedule. Finally, the transmitter includes switching means coupled to the actuating apparatus for switching the transmitter between one operating condition, wherein code signal components are utilized by both the permuting means and the translating means to effect actuation of the coding device, and another operating condition in which code signal components are utilized only by the translating means to effect operation of the coding device. With this arrangement, the permuting means is thereby rendered effectively inoperative in the other operating condition so that its instantaneous adjustment has no bearing on the operation of the coding device.

Figure 2:
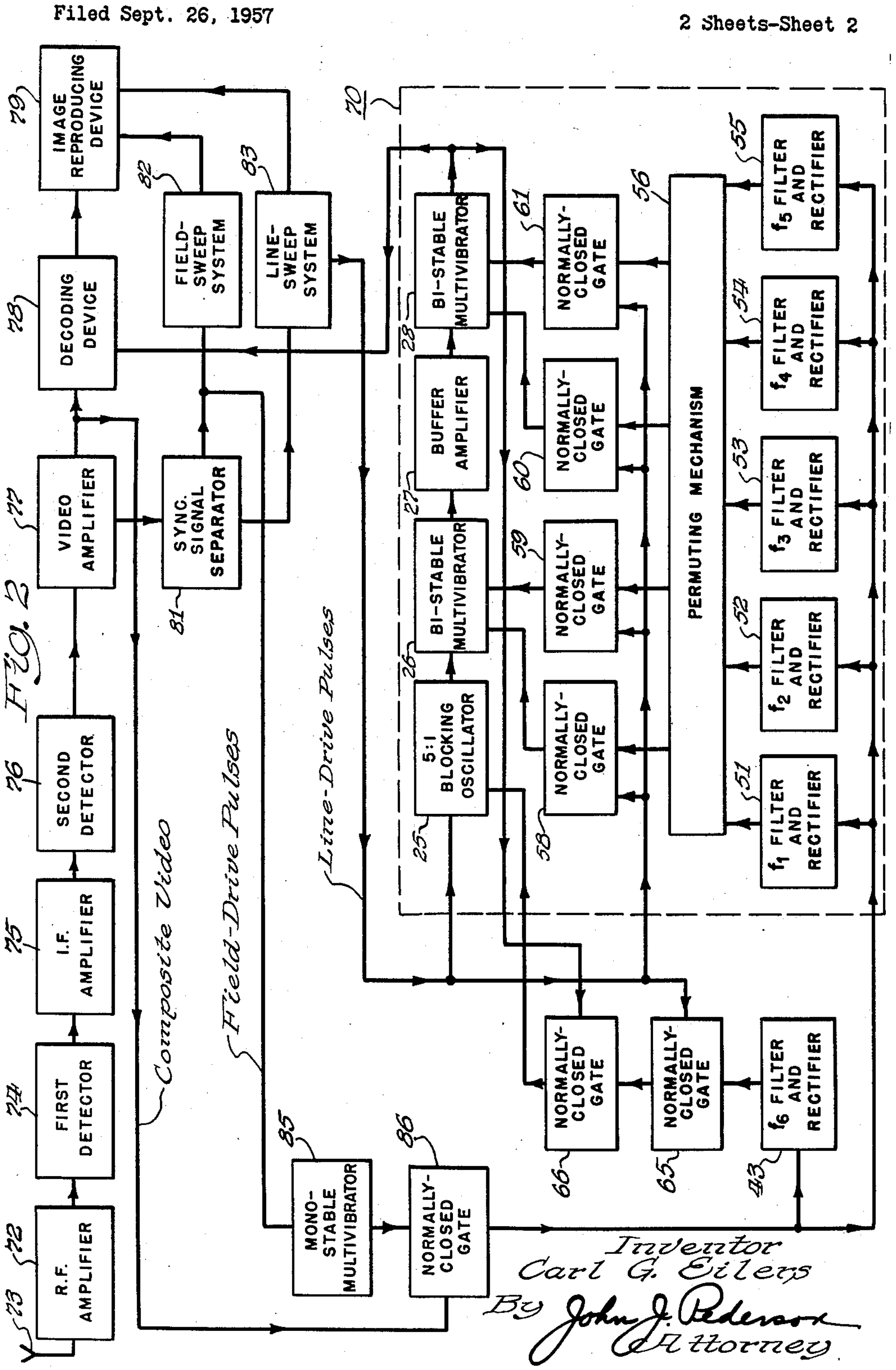

The features of this invention which are believed to be new are set forth with particularity in the appended claims. The invention, together with further objects and advantages thereof, may best be understood, however, by reference to the following description in conjunction with the accompanying drawings, in which:

Figure 1 is a block diagram of a subscription television transmitter constructed in accordance with the invention; and, Figure 2 is a schematic representation of a subscription television receiver constructed to operate in conjunction with the transmitter of Figure 1.

Before turning to a description of the structure of Figure 1, it should be stated that many of the circuits shown in block diagram representation are illustrated in greater detail in the aforementioned Roschke application, Serial No. 479,170. The present invention constitutes an inventive improvement over the system of that prior application, as mentioned before, and thus includes many common circuit elements and combinations. The expedient of block diagram illustration is therefore employed in the obvious interest of simplification.

Considering now the structural composition of the transmitter of Figure 1, a picture-converting device 10 is provided which may take the form of an iconoscope, image orthicon or the like for developing a video signal representing the image to be televised. A coder 11 is coupled to the output terminals of device 10 through a video amplifier 12. This coder may be similar to that disclosed and claimed in Patent 2,758,153, issued August 7, 1956 to Robert Adler, and assigned to the present assignee. More particularly, it may comprise a beam-deflection switch tube having a pair of collector anodes connected respectively to a pair of output circuits which may be selectively interposed in the video channel as the electron beam of the tube is deflected from one to the other of the two anodes. A delay line is included in one of the output circuits so that when the beam is incident on the associated collector anode, a time delay is introduced to the video components relative to the synchronizing components of the radiated television signal. Switching of the beam is accomplished in accordance with a secret code schedule by means of a beam deflection-control or actuating signal applied to deflection electrodes of coder 11. Of course, intermittently varying the relative timing of the video and the synchronizing signals effectively codes or scrambles the television signal since customary television receivers, not containing suitable decoding apparatus, require a television signal wherein there is a constant time relation between all of its components. If such is not the case, intelligible impage reproduction is impossible.

The output circuits of coder 11 are coupled to one pair of input terminals of a mixer amplifier 13 which is connected through a direct-current inserter 14 to a carrier wave generator and modulator 15 having its output terminals connected to an antenna 17. A synchronizing-signal generator 19 supplies the usual field- and line-synchronizing components and associated pedestal components to mixer amplifier 13 over suitable circuit connections, here schematically represented as a single conductor 20. Generator 19 further supplies field- and line-drive pulses to a field-sweep system 22 and to a line-sweep system 23, respectively. The output terminals of sweep systems 22 and 23 are connected to the field- and line-deflection elements (not shown) associated with picture-converting device 10.

Synchronizing-signal generator 19 additionally supplies line-drive pulses to one input of a conventional 5:1 step-down blocking oscillator 25 which has its output terminals connected to the "common" or "counting" input circuit of a conventional bi-stable multivibrator 26. This multivibrator may consist of the usual two cross-coupled triodes rendered conductive in alternation as the multivibrator is triggered between its two stable operating conditions. Blocking oscillator 25 is coupled to both of the triodes by way of the common or counting input so that the multivibrator is always triggered from its instantaneous condition, whatever one that may be, to its opposite condition in response to successive applied pulses from the oscillator. Multivibrator 26 is coupled through a buffer amplifier 27 to the common or counting input circuit of another bi-stable multivibrator 28 which has its output terminals connected to the deflection electrodes of coder 11. The output of amplifier 27 is connected to multivibrator 28 in similar fashion as is oscillator 25 to multivibrator 26 so that multivibrator 28 is always actuated from one to the other of its two stable operating conditions in response to successive pulses from amplifier 27. Since the cascade arrangement of blocking oscillator 25 and multivibrators 26 and 28 realizes a total count-down ratio of 20:1, the output or control signal from multivibrator 28 exhibits a square wave shape having amplitude changes every ten line traces. This effects actuation of coder 11 between its two operating conditions and interposes the time delay network in the video channel during alternate groups of ten successive line trace intervals to introduce a time delay between the radiated video and synchronizing components.

Generator 19 also supplies field-drive pulses to one input circuit of a code signal source or generator 30 and line-drive pulses to another input circuit of genrator 30. Source 30 is provided to develop during a portion of each field-retrace interval a combination of code signal components or bursts individually having a predetermined identifying characteristic, such as frequency, and collectively representing coding information in accordance with their appearance and order with the combination. A suitable code signal source is fully disclosed and claimed in copending application Serial No. 463,702, filed October 21, 1954, in the name of Carl G. Eilers et al., and assigned to the present assignee; thus, source 30 is shown only in block diagram representation to avoid unduly encumbering the description and drawing.

In the illustrated embodiment of the present invention, and as is described in detail in copending application Serial No. 463,702, the code signal generated during each field-retrace interval may comprise a series of six bursts of any of six various signal frequencies $f_1$–$f_6$, inclusive, preferably randomly sequenced and randomly appearing within the interval, as developed by a series of six individual generators. These bursts or code signal components are individually produced between successive line-drive pulses superimposed on the vertical blanking pedestal. The output terminals of the five generators producing the code signal components exhibiting frequencies $f_1$–$f_5$ are connected in common and to the stationary contact 35 of a conventional single-pole single-throw switch 36 and also to the movable contact 38 of another single-pole single-throw switch 39. Switches 39 and 36 are unicontrolled as shown by the dashed construction line connected therebetween. Of course, these two switches may be replaced by one double-pole single-throw switch. The $f_6$ individual generator of source 30 is coupled to the stationary contact 40 of switch 39, to the input circuit of a filter and rectifier unit 43 tuned to respond to signals of frequency $f_6$, and over conductor 44 to another input of mixer 13. Source 30 is connected to generator 19 via conductor 45.

Movable contact 46 of switch 36 is connected to a series of five filter and rectifier units 51–55 respectively selective to assigned ones of the different frequencies $f_1$–$f_5$ to facilitate separation of the code signal components having frequencies $f_1$–$f_5$ from one another. The output terminals of units 51–55 are respectively connected to a series of five input circuits of a permuting mechanism 56 having a series of four output circuits. The input and output circuits of mechanism 56 may be considered code-determining circuits between which mechanism 56 establishes different prescribed ones of a multiplicity of different interconnection patterns. This may be achieved by a family of switches, the adjustment of which selects the desired permutation pattern between inputs and outputs. Suitable permutation switching mechanisms for unit 56 that provide adequate degrees of security against unauthorized deciphering are disclosed, for example, in copending applications Serial No. 407,192, filed February 1, 1954, and issued Dec. 30, 1958 as Patent No. 2,866,961, in the name of George V. Morris; Serial No. 419,301, filed March 29, 1954, and issued August 19, 1958 as Patent 2,847,768, in the name of Jack E. Bridges; Serial No. 490,078, filed February 23, 1955, in the name of George V. Morris et al.; and Serial No. 555,541, filed December 27, 1955, in the name of Jack E. Bridges, all of which are assigned to the present assignee.

Permuting mechanism 56 is provided to permute applied code signal components between its input circuits and output circuits in order that the code bursts developed in source 30 may be further coded before they are used for coding. It is contemplated that this switching arrangement will be adjusted differently for each different program for which a charge is to be assessed and that the permuting mechanism installed at each receiver within a given service area will require a different setting for any selected program, in order that each subscriber must obtain a new required switch setting for each different program.

The four output circuits of permuting mechanism 56 are connected to respective ones of a series of four normally-closed gate circuits 58–61 which are also supplied with line-drive pulses from synchronizing-signal generator 19. The output circuits of gates 58 and 59 are connected to input circuits of bi-stable multivibrator 26 and the output circuits of gates 60 and 61 are connected to input circuits of bi-stable multivibrator 28. Gates 58 and 60 are preferably coupled to the counting or common inputs of multivibrators 26 and 28, respectively, so that each time a pulse is translated through one of those gates the associated multivibrator is triggered from its instantaneous condition to its opposite condition in the same manner as if it has been supplied with a pulse from blocking oscillator 25, in the case of multivibrator 26, or buffer amplifier 27 in the case of multivibrator 28. On the other hand, the connections from gates 59 and 61 are preferably connected to "reset" inputs of multivibrators 26 and 28, respectively, that actuate the multivibrators to predetermined ones of their two operating conditions. If either of the multivibrators is already in that condition when a pulse is supplied thereto from its associated one of gates 59, 61, there will be no actuation and the pulse will be ineffective.

The output terminals of $f_6$ filter and rectifier unit 43 are coupled to a normally-closed gate circuit 65, another input circuit of which is supplied with line-drive pulses from generator 19. Gate 65 is connected in turn to one input of a multi-condition translating means in the form of a normally-closed gate circuit 66 having a translating or open condition and a non-translating or closed condition. The output of gate 66 is connected to a reset input of blocking oscillator 25 in order to reset that oscillator to its reference or zero-count operating step each time a pulse from gate 65 is translated through gate 66. In order to provide a gating signal for varying the translating condition of translating or gating means 66, a connection is provided from the output of bi-stable multivibrator 28 to another input of gate 66. The control signal from multivibrator 28, which exhibits an amplitude characteristic that varies between two control conditions or levels, establishes translating means 66 in its translating condition during time intervals when that amplitude characteristic is established at a predetermined one of the two amplitude levels, and conversely in its non-translating condition when the amplitude is at the other amplitude level.

In describing the operation of the transmitter of Figure 1, it will first be assumed that the switches 36 and 39 are switched from the condition shown to their closed positions. Thus, an electrical connection is made between contacts 46 and 35 and also between 38 and 40. Picture-converting device 10 develops a video signal representing the picture or image information to be televised and after amplification in amplifier 12 the video signal is translated through coder 11 to mixer amplifier 13 wherein it is combined with the customary field- and line-synchronizing and blanking pulses from synchronizing-signal generator 19. Mixer 13 thereby develops a composite video signal which is applied through direct-current inserter 14 to unit 15 wherein it is amplitude modulated on a picture carrier for transmission to subscriber receivers via antenna 17. Sweep systems 22 and 23 are synchronized by the field- and line-drive pulses from generator 19 in conventional manner.

With switches 36 and 39 established in their closed positions, the transmitter is conditioned to transmit a coded television signal on a charge basis. In other words, a permuting switching mechanism like 56 at each subscriber's receiver must be properly adjusted before unscrambling is realized. In this condition, the operation of the transmitter is essentially the same as that of the hereinabove described embodiment of the copending Roschke application, Serial No. 479,170. The only difference is that in the Roschke system, the code bursts employed to gate in line-drive pulses to a gate corresponding to gate 66 are routed or channeled through a permuting mechanism corresponding to unit 56 so that bursts of different frequencies are used for gated reset from time to time, as determined by the permutation pattern established. It will be found that in the present application it is expedient to bypass the permuting mechanism for the gated reset bursts; consequently, they always exhibit the same frequency, namely, $f_6$.

Because of the similarity in operation, only a very brief description is presented here. Coding of the video portion of the telecast is achieved by coder 11 under the influence of a deflection-control signal developed from line-drive pulses by blocking oscillator 25 and multivibrators 26 and 28 for periodically switching the beam of the beam-deflection tube in coder 11 back and forth between its two collector anodes in accordance with the pattern represented by the amplitude variations of the control signal, which occur every ten line traces because of the 20:1 ratio of the counting circuits 25, 26 and 28. This actuation of coding device 11 varies the operating mode of the transmitter after every group of ten successive line-trace intervals by modifying the time relation between the video and synchronizing components of the radiated signal and provides effective picture scrambling or coding.

In order to interrupt this periodic mode changing pattern and increase the complexity of the coding schedule, a combination of code signal components or bursts individually exhibiting one of frequencies $f_1$–$f_6$ is developed in source 30 during a portion of each field-retrace interval. The bursts of frequencies $f_1$–$f_5$ are separated from one another and rectified in circuits 51–55 for individual application to the various input circuits of permuting mechanism 56. This mechanism may establish anyone of a multitude of circuit connections between its input circuits and output circuits so that the rectified pulses are supplied to normally-closed gate circuits 58–61 with a distribution depending on the instantaneous seting of mechanism 56. In this way, the code signal components of frequencies $f_1$–$f_5$ are effectively permuted. Gates 58–61 also receive line-drive pulses from generator 19 and gate in those of the line-drive pulses that occur in time coincidence with the rectified code bursts to the various input circuits of multivibrators 26 and 28. Since the code components are preferably randomly sequenced, the cyclic actuation of the multivibrators normally taking place in response to pulses from oscillator 25 only is disrupted so that upon the termination of the combination of code bursts the counting circuitry is established at a different operating step or condition from that in which it would be established if the periodic actuation had not been interrupted. The control signal developed in the output of multivibrator 28 thus constitutes a square wave which is phase modulated during field-retrace intervals.

In order to add additional scrambling to the system, each time an $f_6$ burst or code signal component occurs it is rectified in unit 43 and utilized to gate in a line-drive pulse to gating means or normally-closed gate circuit 66. The gating signal for multi-condition translating means 66 is derived from the output of multivibrator 28 so that the gate is alternately switched between its translating and non-translating conditions in response to the amplitude changes of the phase modulated square wave. Thus, during intervals when multivibrator 28 is established in a predetermined one of its two conditions an $f_6$ burst is effective to cause the translation of a reset pulse to blocking oscillator 25, whereas during other intervals when unit 28 is in its other condition an $f_6$ burst has no effect.

In order that a subscriber may utilize the coded transmission, it is necessary that each combination of code signal components be made known to the subscriber receivers. To that end, the code bursts of frequencies $f_1$–$f_5$ are combined with the $f_6$ bursts, by way of movable contact 38 and stationary contact 40, and all of the bursts are then applied to mixer amplifier 13 over conductor 44 to be combined with the composite video signal for transmission to the subscriber receivers. Of course, when switch 39 is open only the $f_6$ bursts are supplied to mixer 13. The signal bursts of various frequencies individually occur between successive line-drive pulses superimposed on the vertical or field-retrace blanking pedestals, and in order not to disturb the sweep systems of the subscriber receivers it is desired that the amplitude level of the blanking pulse be modified to effect an inward modulation by the code signal components. This is achieved by applying pulses to synchronizing-signal generator 19 from source 30 over conductor 45 to produce suitable modulating pulses which, in turn, are applied to mixer amplifier 13 by way of conductor 20 to downward modulate the vertical blanking pulse at the appropriate times.

In accordance with the invention, the operation of the transmitter may be changed to convey a coded television signal that may be unscrambled at every subscriber receiver regardless of the setting of its respective permuting mechanism corresponding to 56. In the illustrated embodiment, this is achieved simply by opening switches 36 and 39 to the position illustrated. With this setting, all of the code components of frequencies $f_1$–$f_5$ are ineffective and thus there are no pulses permuted by mechanism 56 for application to multivibrators 26 and 28. The counting circuits (25, 26 and 28) are only operated in response to the periodically recurring line-drive pulses applied to blocking oscillator 25 from generator 19 plus the gated reset pulses resulting from some of the $f_6$ code signal components, namely those of the $f_6$ bursts that occur when gate 66 is open. The square wave thereby developed is thus again phase modulated, in a manner that can only be duplicated in properly equipped receivers, so that its periodicity is disrupted in order that the picture display at an unauthorized receiver will exhibit a relatively high degree of eye-disturbing scrambling. And yet, since the permuting mechanism 56 and all of those like it at the various receivers are rendered effectively inoperative, in that their instantaneous adjustments have no bearing on the operation of the coding and decoding devices because of the absence of components of frequencies $f_1$–$f_5$, the picture display at every receiver containing the decoding equipment will respond to the $f_6$ bursts to accomplish automatic decoding. It is thus possible to convey either entire bonus programs to all receivers properly equipped for which no charge is made, or to transmit the initial portions of certain programs as a preview sample to whet subscriber interest and induce subscription to the entire program.

It is appreciated that at the beginning of the free transmission the multivibrators at each receiver corresponding to 26 and 28 may not be established in the same operating conditions in which the transmitter multivibrators are placed. However, as fully described in the copending Roschke application, Serial No. 479,170, resetting of the multivibrators is not required when gated reset pulses are employed to reset the blocking oscillator. This obtains since at times the receiver gate corresponding to gate 66 either effects the translation of a pulse to the blocking oscillator corresponding to 25 when it should not, namely when a corresponding pulse is not translated at the transmitter, or does not translate a pulse when it should do so, all due to the fact that the gating signal developed in the multivibrator corresponding to 28 is out of step or phase at the receiver. However, when this does happen the operation or non-operation of the corresponding blocking oscillator at some time or other effectively places the corresponding multivibrators in the same operating condition or state as multivibrators 26 and 28 at the transmitter. When this occurs, the receiver falls into step with the transmitter and will remain there. If the receiver is thrown out of synchronism during the reception of the free program information, due to noise signals or for some other reason, automatic resetting will take place in the same manner to bring the receiver back in step once again.

By way of summary, the transmitter of Figure 1 has a coding device 11 for varying the operating mode thereof. Code signal source 30 constitutes a source of code signal components. There is actuating apparatus (embracing all of the circuitry within the large dashed block 70) including adjustable permuting means 56 coupled between source 30 and coding device 11 for permuting some of the code signal components (namely the bursts of frequencies $f_1$–$f_5$) in accordance with the instantaneous permutation pattern established by the permuting means. Actuating apparatus 70 also includes a control mechanism (blocking oscillator 25, multivibrators 26 and 28, amplifier 27, and gate circuits 58–61) coupled to permuting means 56 and to coding device 11 for utilizing the permuted components to at least partially control the operation of the coding device in accordance with a code schedule.

Normally-closed gate 66 serves as a multi-condition translating or gating means coupling (by way of filter and rectifier 43 and gate 65) source 30 to actuating apparatus 70 (specifically to blocking oscillator 25) for supplying certain ones only of the code signal components (namely certain of the $f_6$ bursts since gate 66 is necessarily closed during the occurrence of some of them) to the actuating apparatus to at least partially control the operation of coding device 11. The connection between multivibrator 28 and gate 66 may be considered means coupled to the control mechanism and to translating means 66 for varying the translating condition of the translating means in accordance with a schedule related to the code schedule. In the illustrated embodiment, the relation between these schedules is that of identity, but in at least one of the other embodiments disclosed in the copending Roschke application, Serial No. 479,170, such is not the case.

Switch 36 constitutes switching means coupled to actuating apparatus 70 for switching the transmitter between one operating condition wherein code signal components are utilized by both permuting means 56 and translating means 66 to effect actuation of coding device 11 and another operating condition in which code signal components are utilized only by translating means 66 to effect actuation of coder 11. In this way, permuting means 56 is rendered effectively inoperative in the other operating condition so that its instantaneous adjustment has no bearing or effect on the operation of the coding device.

The receiver of Figure 2 is constructed in accordance with the invention to decode especially the coded television signal developed in the transmitter of Figure 1. A radio-frequency amplifier 72 has its input terminals connected to an antenna 73 and its output circuit connected to a first detector 74, connected in turn through an IF amplifier 75 to a second detector 76. This detector is coupled through a video amplifier 77 and a decoder 78 to the input terminals of an image reproducing device or picture tube 79. Decoding device 78 may be identical in construction to video coder 11 in the transmitter except that it is controlled to operate in a complementary fashion in order to effectively compensate for variations in the timing of the video and synchronizing components of the received television signal. Specifically, when a delay is introduced at the transmitter between the occurrence of a radiated line-drive pulse and the video information occurring during the immediately succeeding line-trace interval, that video signal is translated through decoding device 78 with no delay, whereas when no delay is introduced at the transmitter a delay is imparted to the video signal in decoding device 78. Video amplifier 77 is also coupled to a synchronizing-signal separator 81 which is connected to the usual field-sweep system 82 and line-sweep system 83 connected in turn to the deflection elements (not shown) associated with reproducing device 79.

In order to facilitate the separation of the code signal bursts or components from the composite television signal, a mono-stable multivibrator 85 is connected to separator 81 to receive field-drive pulses therefrom and the output of the multivibrator is coupled to one input of a normally-closed gate 86, another input of which is coupled to the output of amplifier 77 to receive the still-coded composite video signal. The output of gate 86 is connected to an $f_6$ filter and rectifier unit 43 and also to a series of filter and rectifier units 51–55, all corresponding to their identically numbered elements in the transmitter. In fact, the remaining circuitry in Figure 2 is identical in construction and arrangement with the correspondingly numbered units in the transmitter of Figure 1. The only difference is that while the blocking oscillator 25 in the transmitter receives line-drive pulses from the synchronizing-signal generator, oscillator 25 in the receiver of Figure 2 receives line-drive pulses from line-sweep system 83.

In the operation of the described receiver, the coded television signal is intercepted by antenna 73, amplified in radio-frequency amplifier 72 and heterodyned to the selected intermediate frequency of the receiver in first detector 74. The resulting intermediate-frequency signal is amplified in intermediate-frequency amplifier 75 and detected in second detector 76 to produce a coded composite video signal which is then amplified in video amplifier 77 and translated through decoding device 78 to the input electrodes of image reproducer 79 to control the intensity of the cathode-ray beam in that reproducer in conventional fashion. The synchronizing components are separated in separator 81 and utilized to control the sweep functions in a customary manner.

Mono-stable multivibrator 85 responds to field-drive pulses to produce gating pulses each having a duration sufficient to embrace the time interval in which the code signal components appear during each field-retrace interval, and thus those components are gated in by gate 86 for application to the filter and rectifier units 43 and 51–55. Decoding at the receiver is accomplished in the identical manner explained hereinbefore in connection with the coding operation at the transmitter. With transmitter switches 36 and 39 closed, all six of the frequencies are employed for coding at the transmitter and for decoding at the receiver, and permuting mechanism 56 in the receiver must be adjusted to the same setting as that employed for mechanism 56 in the transmitter; a suitable charge may be assessed for the switch setting information.

When switches 36 and 39 are opened at the transmitter, only the $f_6$ bursts are employed at the transmitter and radiated to the receiver. Consequently, filter and rectifier units 51–55 at the receiver receive no bursts and therefore do not supply any actuating pulses to the bistable multivibrators. Since only the $f_6$ code signal components are transmitted they alone are employed for decoding. Thus, since the $f_6$ bursts and gate 66 by-pass mechanism 56 the receiver decoding apparatus and the transmitter coding apparatus function in synchronism regardless of the setting of the receiver permutation switches 56.

A system is therefore provided wherein it is always possible to code or scramble a television signal so that it cannot be decoded at non-subscriber receivers, and yet the transmitter may be switched from one operating condition, in which a particular adjustment of the receiver permuting mechanism 56 is required before decoding is achieved to provide program information for which a charge is made, to another operating condition in which decoding is automatically obtained with any setting of the receiver permuting mechanism 56 to facilitate the transmission and reception of coded program information for which no charge is assessed.

Certain features described in the present application are disclosed and claimed in copending applications Serial No. 700,854, filed December 5, 1957, in the name of Myron G. Pawley et al., Serial No. 700,855, filed December 5, 1957, in the name of Jacob M. Sacks, and Serial No. 310,309, filed September 18, 1952 in the name of Alexander Ellett, all of which are assigned to the present assignee.

While a particular embodiment of the invention has been shown and described, modifications may be made, and it is intended in the appended claims to cover all such modifications as may fall within the true spirit and scope of the invention.

I claim:

1. A subscription television transmitter comprising: a coding device for varying the operating mode of said transmitter; a source of code signal components; actuating apparatus including adjustable permuting means coupled between said source and said coding device for permuting some of said code signal components in accordance with the instantaneous permutation pattern established by said permuting means and further including a control mechanism coupled to said permuting means and to said coding device for utilizing the permuted components to at least partially control the operation of said coding device in accordance with a code schedule; multi-condition translating means coupling said source to said actuating apparatus for supplying certain ones only of said code signal components to said actuating apparatus to at least partially control the operation of said coding device; means coupled to said control mechanism and to said translating means for varying the translating condition of said translating means in accordance with a schedule related to said code schedule; and switching means coupled to said actuating apparatus for switching said transmitter between one operating condition wherein code signal components are utilized by both said permuting means and said translating means to effect actuation of said coding device and another operating condition in which code signal components are utilized only by said translating means to effect operation of said coding device, said permuting means thereby being rendered effectively inoperative in said other operating condition so that its instantaneous adjustment has no bearing on the operation of said coding device.

2. A subscription television transmitter comprising: a coding device for varying the operating mode of said transmitter; a source of code signal components; actuating apparatus including adjustable permuting means coupled between said source and said coding device for permuting some of said code signal components in accordance with the instantaneous permutation pattern established by said permuting means and further including a control mechanism coupled to said permuting means and to said coding device for utilizing the permuted components to at least partially control the operation of said coding device in accordance with a predetermined code schedule; multi-condition translating means coupling said source to said control mechanism for supplying certain ones only of said code signal components to said control mechanism to at least partially control the operation of said coding device; means coupled to said control mechanism and to said translating means for varying the translating condition of said translating means in accordance with said predetermined code schedule; and switching means coupled to said actuating apparatus for switching said transmitter between one operating condition wherein code signal components are utilized by both said permuting means and said translating means to effect actuation of said coding device and another operating condition in which code signal components are utilized only by said translating means to effect operation of said coding device, said permuting means thereby being rendered effectively inoperative in said other operating condition so that its instantaneous adjustment has no bearing on the operation of said coding device.

3. A subscription television transmitter comprising: a coding device for varying the operating mode of said transmitter; a source of code signal components; actuating apparatus including adjustable permuting means coupled between said source and said coding device for permuting some of said code signal components in accordance with the instantaneous permutation pattern established by said permuting means and further including a control mechanism coupled to said permuting means and to said coding device for utilizing the permuted components to at least partially control the operation of said coding device in accordance with a code schedule; gating means having a translating condition and a non-translating condition coupling said source to said actuating apparatus for translating certain ones only of said code signal components to said actuating apparatus to at least partially control the operation of said actuating device; means coupled to said control mechanism and to said gating means for establishing said gating means in its translating condition during certain spaced intervals and in its non-translating condition during other spaced intervals in accordance with a schedule related to said code schedule; and switching means coupled to said actuating apparatus for switching said transmitter between one operating condition wherein code signal components are utilized by both said permuting means and said gating means to effect actuation of said coding device and another operating condition in which code signal components are utilized only by said gating means to effect operation of said coding device, said permuting means thereby being rendered effectively inoperative in said other operating condition so that its instantaneous adjustment has no bearing on the operation of said coding device.

4. A subscription television transmitter comprising: a coding device having a plurality of operating conditions each of which establishes said transmitter in a different operating mode; a source of code signal components; actuating apparatus including adjustable permuting means coupled between said source and said coding device for permuting some of said code signal components in accordance with the instantaneous permutation pattern established by said permuting means and further including a control mechanism coupled to said permuting means and to said coding device for utilizing the permuted components to supply a control signal, having a characteristic that varies between two predetermined control conditions, to said coding device to effect actuation thereof between its operating conditions in accordance with a code schedule represented by the characteristic variations of said control signal; gating means having a translating condition and a non-translating condition coupling said source to said actuating apparatus for translating certain ones only of said code signal components to said actuating apparatus to at least partially control the operation of said coding device; means coupling said control mechanism to said gating means for supplying said control signal thereto to establish said gating means in its translating condition during time intervals when said characteristic is established at one of its control conditions and in its non-translating condition during the intervening time intervals when said characteristic is establshed at the other of its control conditions; and switching means coupled to said actuating apparatus for switching said transmitter between one operating condition wherein code signal components are utilized by both said permuting means and said gating means to effect actuation of said coding device and another operating condition in which code signal components are utilized only by said gating means to effect operation of said coding device, said permuting means thereby being rendered effectively inoperative in said other operating condition so that its instantaneous adjustment has no bearing on the operation of said coding device.

5. A subscription television transmitter comprising: a coding device for varying the operating mode of said transmitter; a source of code signal components; actuating apparatus coupled between said source and said coding device and including a multiplicity of code-determining circuits over which some of said code signal components are translated, an adjustable permutation switching mechanism for establishing different prescribed ones of a multiplicity of different interconnection patterns between said circuits for permuting said last-mentioned code signal components in accordance with the instantaneous permutation pattern established by said switching mechanism, and further including a control mechanism coupled to said permutation switching mechanism and to said coding device for utilizing the permuted components to at least partially control the operation of said coding device in accordance with a code schedule; multi-condition translating means coupling said source to said actuating apparatus for supplying certain ones only of said code signal components to said actuating apparatus to at least partially control the operation of said coding device; means coupled to said control mechanism and to said translating means for varying the translating condition of said translating means in accordance with a schedule related to said code schedule; and switching means coupled to said actuating apparatus for switching said transmitter between one operating condition wherein code signal components are utilized by both said permutation switching mechanism and said translating means to effect actuation of said coding device and another operating condition in which code signal components are utilized only by said translating means to effect operation of said coding device, said permutation switching mechanism thereby being rendered effectively inoperative in said other operating condition so that its instantaneous adjustment and its resulting instantaneous interconnection pattern established between said code-determining circuits have no bearing on the operation of said coding device.

6. A subscription television transmitter comprising: a coding device for varying the operating mode of said transmitter; a source of code signal components individually having a different identifying characteristic and collectively representing coding information; actuating apparatus including adjustable permuting means coupled between said source and said coding device for permuting only those of said code signal components exhibiting predetermined identifying characteristics in accordance with the instantaneous permutation pattern established by said permuting means and further including a control mechanism coupled to said permuting means and to said coding device for utilizing the permuted components to at least partially control the operation of said coding device in accordance with a code schedule; gating means having a translating condition and a non-translating condition; means coupled between said source and said gating means for supplying to said gating means only those of said code signal components having an identifying characteristic different from said predetermined identifying characteristics; means coupled to said control mechanism and to said gating means for establishing said gating means in its translating condition during certain spaced operating intervals and in its non-translating condition during other spaced operating intervals in accordance with a schedule related to said code schedule; and switching means coupled to said actuating apparatus for switching said transmitter between one operating condition wherein code signal components are utilized by both said permuting means and said gating means to effect actuation of said coding device and another operating condition in which code signal components are utilized only by said gating means to effect operation of said coding device, said permuting means thereby being rendered effectively inoperative in said other operating condition so that its instantaneous adjustment has no bearing on the operation of said coding device.

7. A subscription television transmitter comprising: a coding device for varying the operating mode of said transmitter; a source of code signal components; actuating apparatus including adjustable permuting means coupled between said source and said coding device for permuting some of said code signal components in accordance with the instantaneous permutation pattern established by said permuting means and further including a control mechanism coupled to said permuting means and to said coding device for utilizing the permuted components to at least partially control the operation of said coding device in accordance with a code schedule; multi-condition translating means coupling said source to said actuating apparatus for supplying certain ones only of said code signal components to said actuating apparatus to at least partially control the operation of said coding device; means coupled to said control mechanism and to said translating means for varying the translating condition of said translating means in accordance with a schedule related to said code schedule; and switching means coupled between said source and said actuating apparatus for switching said transmitter between one operating condition wherein code signal components are utilized by both said permuting means and said translating means to effect actuation of said coding device and another operating condition in which code signal components are utilized only by said translating means to effect operation of said coding device, said permuting means thereby being rendered effectively inoperative in said other operating condition so that its instantaneous adjustment has no bearing on the operation of said coding device.

8. A subscription television transmitter comprising: a coding device for varying the operating mode of said transmitter; a source of code signal components; actuating apparatus including adjustable permuting means coupled between said source and said coding device for permuting some of said code signal components in accordance with the instantaneous permutation pattern established by said permuting means and further including a control mechanism coupled to said permuting means and to said coding device for utilizing the permuted components to at least partially control the operation of said coding device in accordance with a code schedule; multi-condition translating means coupling said source to said actuating apparatus for supplying certain ones only of said code signal components to said actuating apparatus to at least partially control the operation of said coding device; means coupled to said control mechanism and to said translating means for varying the translating condition of said translating means in accordance with a schedule related to said code schedule; switching means coupled to said actuating apparatus for switching said transmitter between one operating condition wherein code signal components are utilized by both said permuting means and said translating means to effect actuation of said coding device and another operating condition in which code signal components are utilized only by said translating means to effect operation of said coding device, said permuting means thereby being rendered effectively inoperative in said other operating condition so that its instantaneous adjustment has no bearing on the operation of said coding device; and means including additional switching means, unicontrolled with said first-mentioned switching means, for transmitting all of said code signal components when said transmitter is established in said one operating condition and for transmitting less than all of said components, but including said certain ones of said components, when said transmitter is established in said other operating condition.

9. A subscription television receiver comprising: a decoding device for varying the operating mode of said receiver; a source of code signal components; an adjustable permuting means coupled to said source for permuting some of said code signal components; a control mechanism for utilizing the permuting components to at least partially control the operation of said decoding device in accordance with a code schedule; multi-condition translating means coupling said source to said control mechanism and by-passing said permuting means for supplying certain ones only of said code signal components to said control mechanism to at least partially control the operation of said decoding device; and means coupled to said control mechanism and to said translating means for varying the translating condition of said translating means in accordance with a schedule related to said code schedule.

10. A subscription television receiver comprising: a decoding device for varying the operating mode of said receiver; a source of code signal components; a multiplicity of code-determining circuits over which some of said code signal components are translated; an adjustable permutation switching mechanism for establishing different prescribed ones of a multiplicity of different interconnection patterns between said circuits for permuting said last-mentioned code signal components in accordance with the instantaneous permutation pattern established by said permutation switching mechanism; a control mechanism coupled to said code-determining circuits for utilizing the permuted components to at least partially control the operation of said decoding device in accordance with a code schedule; gating means having a translating condition and a non-translating condition coupling said source to said control mechanism and by-passing said permutation switching mechanism for supplying certain ones only of said code signal components to said control mechanism to at least partially control the operation of said decoding device; and means coupled to said control mechanism and to said gating means for establishing said gating means in its translating condition during certain spaced intervals and in its non-translating condition during other spaced intervals in accordance with a schedule related to said code schedule.

11. A subscription television receiver for utilizing a received television signal which has been coded during certain time intervals by code signal components exhibiting a plurality of different identifying characteristics and during other time intervals by other code signal components all exhibiting a single predetermined identifying characteristic, said receiver comprising: a decodng device for varying the operating mode of said receiver; a source for providing all of said signal components; an adjustable permuting means coupled to said source and operable during said certain time intervals for permuting the first-mentioned code signal components exhibiting said plurality of different identifying characteristics in accordance with the instantaneous permutation pattern established by said permuting means; a control mechanism for utilizing the permuted components to at least partially control the operation of said decoding device in accordance with a code schedule; multi-condition translating means coupling said source to said control mechanism, by-passing said permuting means, and responsive to at least some of the code signal components having said predetermined identifying characteristic for supplying actuating signals to said control mechanism to at least partially control the operation of said decoding device; and means coupled to said control mechanism and to said translating means for varying the translating condition of said translating means in accordance with a schedule related to said code schedule, said control mechanism responding only to the actuating signals translated thereto by said translating means during said other time intervals so that the instantaneous adjustment of the permuting means has no bearing on the operation of said control mechanism and consequently on said decoding device.

12. In a subscription television transmitter-receiver combination for translating a television signal: a transmitter comprising a coding device for varying the operating mode of said transmitter to code said television signal, a source of code signal components, actuating apparatus including adjustable permuting means coupled between said source and said coding device for permuting some of said code signal components in accordance with the instantaneous permutation pattern established by said permuting means and further including a control mechanism coupled to said permuting means and to said coding device for utilizing the permuted components to at least partially control the operating of said coding device in accordance with a predetermined code schedule, multi-condition translating means coupling said source to said actuating apparatus for supplying certain ones only of said code signal components to said actuating apparatus to at least partially control the operation of said coding device, means coupled to said control mechanism and to said translating means for varying the translating condition of said translating means in accordance with said predetermined schedule, switching means coupled to said actuating apparatus for switching said transmitter between one operating condition wherein code signal components are utilized by both said permuting means and said translating means to effect actuation of said coding device and another operating condition in which code signal components are utilized only by said translating means to effect operation of said coding device, said permuting means thereby being rendered effectively inoperative in said other operating condition so that its instantaneous adjustment has no bearing on the operation of said coding device; and means for transmitting said coded television signal and said code signal components; and a receiver comprising a decoding device for varying the operating mode of said receiver to effect decoding of the received coded television signal, means for deriving said code signal components, an additional adjustable permuting means coupled to said deriving means for permuting some of the received code signal components, an additional control mechanism coupled to said additional permuting means for utilizing the permuted components to at least partially control the operation of said decoding device in accordance with said predetermined code schedule, additional multi-condition translating means coupling said deriving means to said additional control mechanism and by-passing said additional permuting means for supplying certain ones only of the received code signal components to said additional control mechanism to at least partially control the operation of said decoding device, and means coupled to said additional control mechanism and to said additional translating means for varying the translating condition of said additional translating means in accordance with said predetermined schedule.

13. A subscription television system comprising: a subscription television transmitter for broadcasting television program signals having audio and video components, at least one of which is scrambled in accordance with a code schedule; a plurality of subscription television receivers each equipped with decoding apparatus actuable to restore the intelligibility of said scrambled program signals and each further equipped with a control device for controlling the operation of said decoding apparatus in accordance with said code schedule while providing a basis for determining actual utilization of said scrambled program signals; and means under the control of said transmitter for actuating the decoding apparatus of all of said receivers entirely independently of their associated control devices to provide unscrambled reception of selected programs for all subscribers to said system while retaining secrecy with respect to television receivers not equipped with such decoding apparatus.

14. A subscription television system comprising: a subscription television transmitter for broadcasting television program signals having audio and video components, at least one of which is scrambled in accordance with a code schedule; a plurality of subscription television receivers each equipped with decoding apparatus actuable to restore the intelligibility of said scrambled program signals and each further equipped with a control device, that is at least partially adjustable by the subscriber to which the receiver is assigned, for controlling the operation of said decoding apparatus in accordance with said code schedule while providing a basis for determining actual utilization of said scrambled program signals; and means under the control of said transmitter for actuating the decoding apparatus of all of said receivers entirely independently of their associated control devices, without requiring any specific adjustment by the subscribers, to provide unscrambled reception of selected programs for all subscribers to said system while retaining secrecy with respect to television receivers not equipped with such decoding apparatus.

15. A subscription television system comprising: a subscription television transmitter for broadcasting television program signals having audio and video components, at least one of which is scrambled in accordance with a code schedule selected from either one of two different groups of code schedules; a plurality of subscription television receivers each equipped with decoding apparatus actuable to restore the intelligibility of said scrambled program signals and each further equipped with a multi-position control device for controlling the operation of said decoding apparatus in accordance with said selected code schedule while providing a basis for determining actual utilization of said scrambled program signals, said control device requiring a particular adjustment on the part of the subscriber to which it is assigned any time said scrambled program signals are coded in accordance with a code schedule selected from a predetermined one of said groups, whereas automatic decoding takes place, irrespective of the instantaneous position of said control device, any time said scrambled program signals are coded in accordance with a code schedule selected from the other one of said groups; and means under the control of said transmitter for actuating the decoding apparatus of all of said receivers entirely independently of their associated control devices to provide unscrambled reception of selected programs for all subscribers to said system while retaining secrecy with respect to television receivers not equipped with such decoding apparatus.

16. A subscription television receiver for utilizing a received television signal which has been coded during certain program intervals in accordance with a code schedule selected from a first group of code schedules and coded during other program intervals in accordance with a code schedule selected from a second group of code schedules, and for also utilizing received code signal components having a pattern indicating the instantaneous code schedule of said television signal and also indicating from which group the code schedule was selected, said receiver comprising: a decoding mechanism actuable to effect decoding of said received television signal; means including an adjustable multi-position control device responsive to those code signal components having a pattern indicating that the instantaneous code schedule of the received television signal is one of said first group for effecting actuation of said decoding mechanism during said certain program intervals, said control device requiring a predetermined adjustment, as determined at least in part by the particular code schedule of the received television signal, before decoding is achieved; and means, including translating means whose translating condition is controlled by said decoding mechanism, responsive to those code signal components having a pattern indicating that the instantaneous code schedule of the received television signal is one of said second group for effecting actuation of said decoding mechanism, independently of said control device, during said other program intervals to achieve decoding irrespective of the instantaneous adjustment of said control device.

References Cited in the file of this patent

UNITED STATES PATENTS 2,816,156 Pawley ---------------- Dec. 10, 1957

FOREIGN PATENTS 1,120,543 France ---------------- July 9, 1956